United States Patent

Kerley et al.

[11] Patent Number: 5,257,669
[45] Date of Patent: Nov. 2, 1993

[54] CLIMBING ROBOT

[75] Inventors: James J. Kerley, Greenbelt; Wayne D. Eklund, Edgewood; Edward L. May, Baltimore, all of Md.

[73] Assignee: The United States of America as represented by the Administrator of the National Aeronautics and Space Administration, Washington, D.C.

[21] Appl. No.: 843,861

[22] Filed: Feb. 10, 1992

[51] Int. Cl.⁵ .................. B62D 57/024; B25J 5/00
[52] U.S. Cl. ......................................... 180/7.1; 901/1
[58] Field of Search ................... 180/7.1, 8.1; 901/1

[56] References Cited

U.S. PATENT DOCUMENTS

| | | | |
|---|---|---|---|
| 3,407,749 | 10/1968 | Frig | 180/7.1 X |
| 3,623,566 | 11/1971 | Orloff | 180/7.1 |
| 4,637,494 | 1/1987 | Iida et al. | 187/10 |
| 4,674,949 | 6/1987 | Kroczynski | 414/750 |
| 4,727,949 | 3/1988 | Rea et al. | 180/9.32 |
| 4,793,275 | 12/1988 | Usher | 114/270 |
| 4,919,223 | 4/1990 | Egger et al. | 180/8.1 |
| 4,932,489 | 6/1990 | Evans et al. | 180/7.1 X |
| 4,940,382 | 7/1990 | Castelain et al. | 414/750 |
| 4,946,421 | 8/1990 | Kerley, Jr. | 464/56 |
| 5,094,311 | 3/1992 | Akeel | 901/1 X |
| 5,161,631 | 11/1992 | Urakami | 180/8.1 X |

OTHER PUBLICATIONS

NASA Tech Briefs, Dec. 1991, "The Climbing Robot".

Primary Examiner—Margaret A. Focarino
Assistant Examiner—Pete English
Attorney, Agent, or Firm—Paul S. Clohan, Jr.; R. Dennis Marchant; Guy M. Miller

[57] ABSTRACT

A mobile robot for traversing any surface consisting of a number of interconnected segments, each interconnected segment having a first "U" frame member, a second "U" frame member, a compliant joint between the first "U" frame member and the second "U" frame member, a number of linear actuators between the two frame members acting to provide relative displacement between the frame members, a foot attached to the second "U" frame member for adherence of the segment to the surface, an inter-segment attachment attached to the first "U" frame member for interconnecting the segments, a power source connected to the linear actuators, and a computer/controller for independently controlling each linear actuator in each interconnected segment such that the mobile robot moves in a caterpillar like fashion.

17 Claims, 16 Drawing Sheets

FIG. 9d STEP 4
FIG. 9c STEP 3
FIG. 9b STEP 2
FIG. 9a STEP 1

CLIMBING ROBOT

ORIGIN OF THE INVENTION

The invention described herein was made in the performance of work under a NASA contract and by an employee of the United States Government and is subject to the provisions of Section 305 of the National Aeronautics and Space Act of 1958, Public Law 85-568 (72 Stat. 435; 42 U.S.C. §2457), and may be manufactured and used by or for the Government for governmental purposes without the payment of any royalties thereon or therefor.

TECHNICAL FIELD

This invention relates to robotic devices and more specifically to a mobile robot that is able to move in caterpillar fashion along a variety of different surfaces.

BACKGROUND ART

Numerous robotic moving bodies are available in the prior art for a variety of uses. One example is described in U.S. Pat. No. 4,637,494 which is an apparatus for moving carriages along ladders. In this device, a carriage carrying a robot, television camera, etc. is moved along a ladder having spaced ledges. The carriage has a number of gripper units moved in the direction of movement of the carriage by air cylinders or motor driven threaded rods. Each gripper unit is reciprocated toward and away from the ladder and provided with a motive device for opening and closing grippers for gripping or releasing the ledges.

Another example of an moving robot is described in U.S. Pat. No. 4,674,949 which is described as a robot with climbing feet. This patent discloses a mobile robot which is able to cling. The example illustrated shows a vehicle with two cooperating trains, each of which has four feet. Locomotion is achieved by placing four feet of the first train down and lifting the second train. The lifted train is moved along a rail into a new position where it comes into contact with the ground and becomes the new base. The train has suction cups for feet and attaches to the ground, then repeats the process by moving the first train in the same manner. The purpose of this invention is for horizontal locomotion.

A third example is described in U.S. Pat. No. 4,940,382 which is titled "An autonomous moving body for transporting a tool at a constant speed". This patent discloses three cooperating components to provide constant velocity linear motion. Two of the components have attachment feet while the third rides back and forth along a track. The two mechanisms with feet move one at a time providing a jerky motion of stop and go. The third evens the motion by moving when the base is still.

All of the prior art robotic moving devices, while useful to a degree, are limited in their ability to adapt to a changing terrain. For example, the device described in the '494 patent is limited to ladders, and the devices described in the other two patents are limited to relatively smooth surfaces such as the skin of an aeroplane. None of these three devices has the ability to curve to the left or right or to curve up and down. And none of these devices is able to twist its body to go from a surface on one plane to a surface on another plane.

STATEMENT OF THE INVENTION

It is therefore an object of the present invention to provide a robotic moving body that is able to move forward, backward, curve left and right, and curve up and down in a caterpillar like fashion.

It is another object of the present invention to provide a dexterous robot that is able to climb and descend a variety of structures.

A further object of the present invention is to provide a robot that is able to function upside down, rightside up, and sideways.

A still further object of the present invention is to provide a robot that is able to twist its body thereby enabling it to move from a surface on one plane to a surface on another plane.

These and other objects are achieved by providing a mobile robot with a number of identical segments which are coupled to act as one. Locomotion is accomplished by the timed cooperative action of the segments. Motion is similar to that of a caterpillar. In various configurations, the robot may be adapted for different tasks. Suction cups, magnets, wheels, and air cushions are examples of feet which could be used for vertical climbing, horizontal locomotion, traversing steps, and the like.

DETAILED DESCRIPTION OF THE INVENTION

Figure 1:
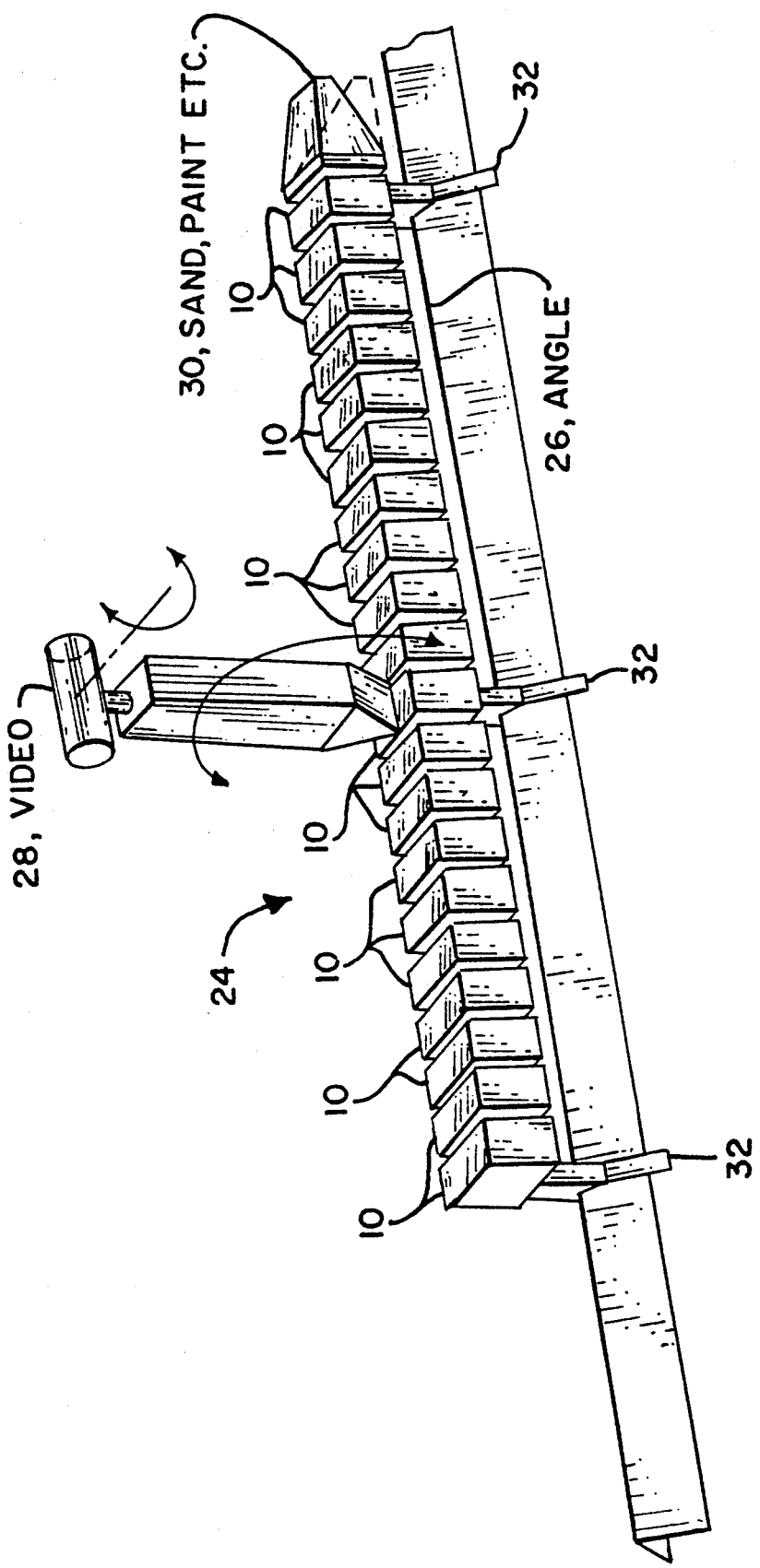
FIG. 1 shows a climbing robot according to the teachings of the present invention moving up a leg of a tower.

Referring now to FIG. 1, a climbing robot 24 moving up an angle leg 26 of a tower is shown having twenty segments 10. Video camera 28 on top of robot 24 can observe its motion and signal out the results of damage, etc. It can also give direction where to sand blast or to paint with head 30. Feet 32 can be grippers, magnets or suction cups with abductors. As none of these type of civil engineering structures have perfect dimensions, a compliance joint (not shown) in each segment 10 can make up for these errors. The compliance joints in this application have a number or tasks to perform. They must take the entire shear load of robot 24 as there is no positive structure holding the parts together. The compliance joints also act as a brake and control for the actuators (not shown) in the segments 10. The compliance joints also have to bend and adjust themselves to irregular surfaces. A robot 24 climbing a steel tower will encounter bolts and nuts. The segments 10 have to adjust themselves to slide over these rough surfaces. If robot 24 were to scrape against or bang into something the compliance joints will take the impact load off the robot as they are compliant. Forward element or head 30 requires special motorized motion to take care of the expected task it is to undertake. For relatively flat surfaces, only three segments 10 are necessary. But for large bends it is necessary to have a larger number of segments 10 as shown. The actuators in the segments 10 have to lift the first segment 10 over and then as it goes over the top it has to turn the actuators the other way to get back on the surface. To make a complete right turn, as would be necessary on a tower as the robot goes from the vertical members to the horizontal members, it is only necessary to move the actuators in one direction only.

Figure 2:
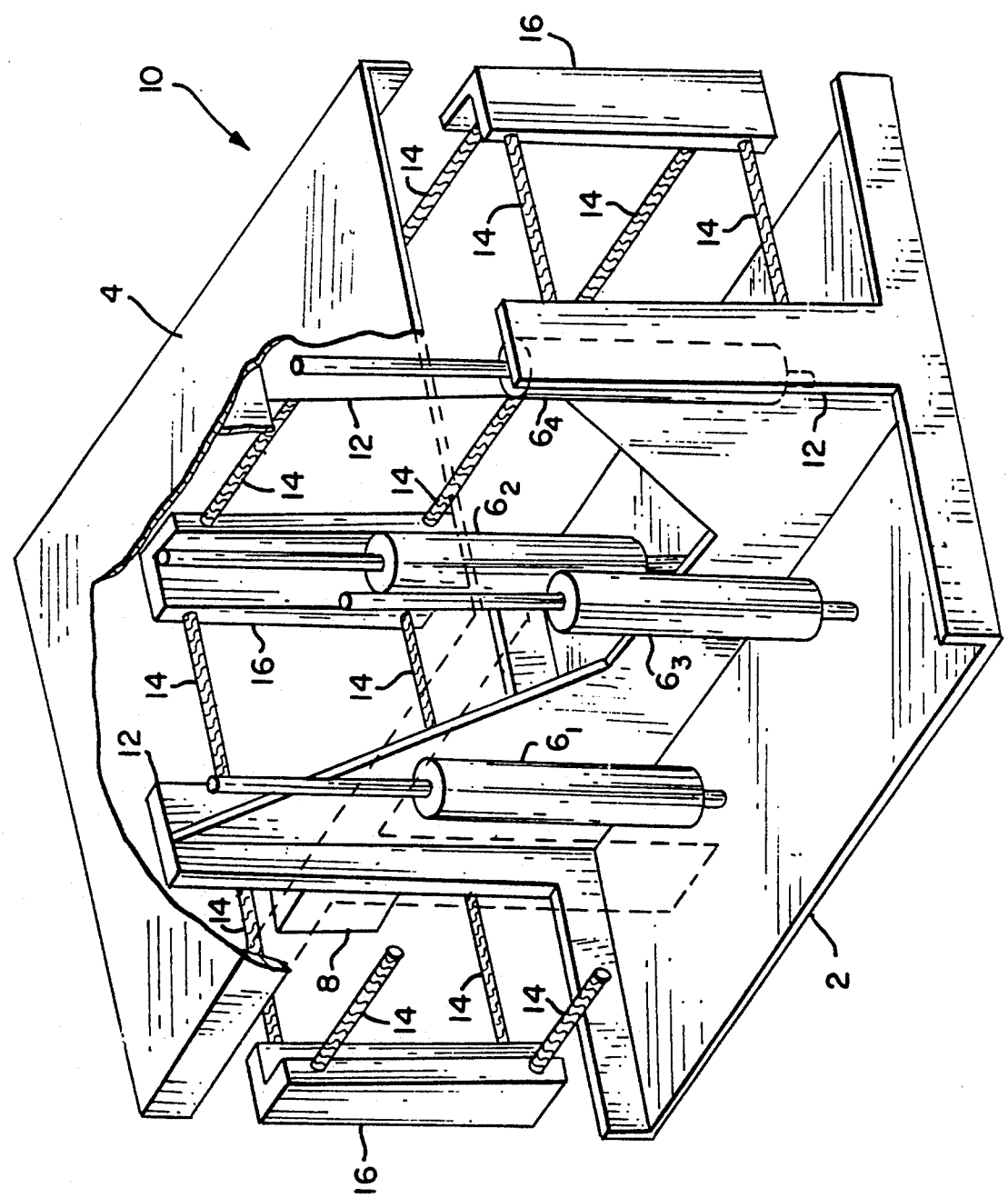
FIG. 2 is perspective view of one segment of the climbing robot of FIG. 1.

Referring now to FIG. 2, a perspective view of a robot segment 10 of the climbing robot 24 of FIG. 1 is shown. Segment 10 consists of an first frame member 2 in the shape of a "U" compliantly joined to a second frame member 4 in the shape of a "U" via a plurality of cable segments 14 and end retainers 16. The compliant joining of first "U" frame 2 to second "U" frame 4 is thoroughly discussed in U.S. Pat. No. 4,946,421, which is hearby incorporated by reference, and consequently no further description regarding the particular mounting methods is necessary. First "U" frame 2 and second "U" frame 4 each have a stiffener 12 which can be integral to the structure or welded, bolted or riveted on; in some instances, depending upon the strength of the material used to construct the two "U" frames, stiffeners 12 may not be needed. Segment 10 also consists of a plurality of linear actuators 61, 62, 63, and 64 providing segment 10 with four or more degrees of freedom and a surface adherence device 8, which in this case is an electro-magnet, affixed to second "U" frame 4 and acting as a "foot" for segment 10. Segment 10 is the basic building block for construction of a climbing robot, and any number of segments 10 can be interconnected to construct a particular climbing robot as will be discussed later.

Figure 3:
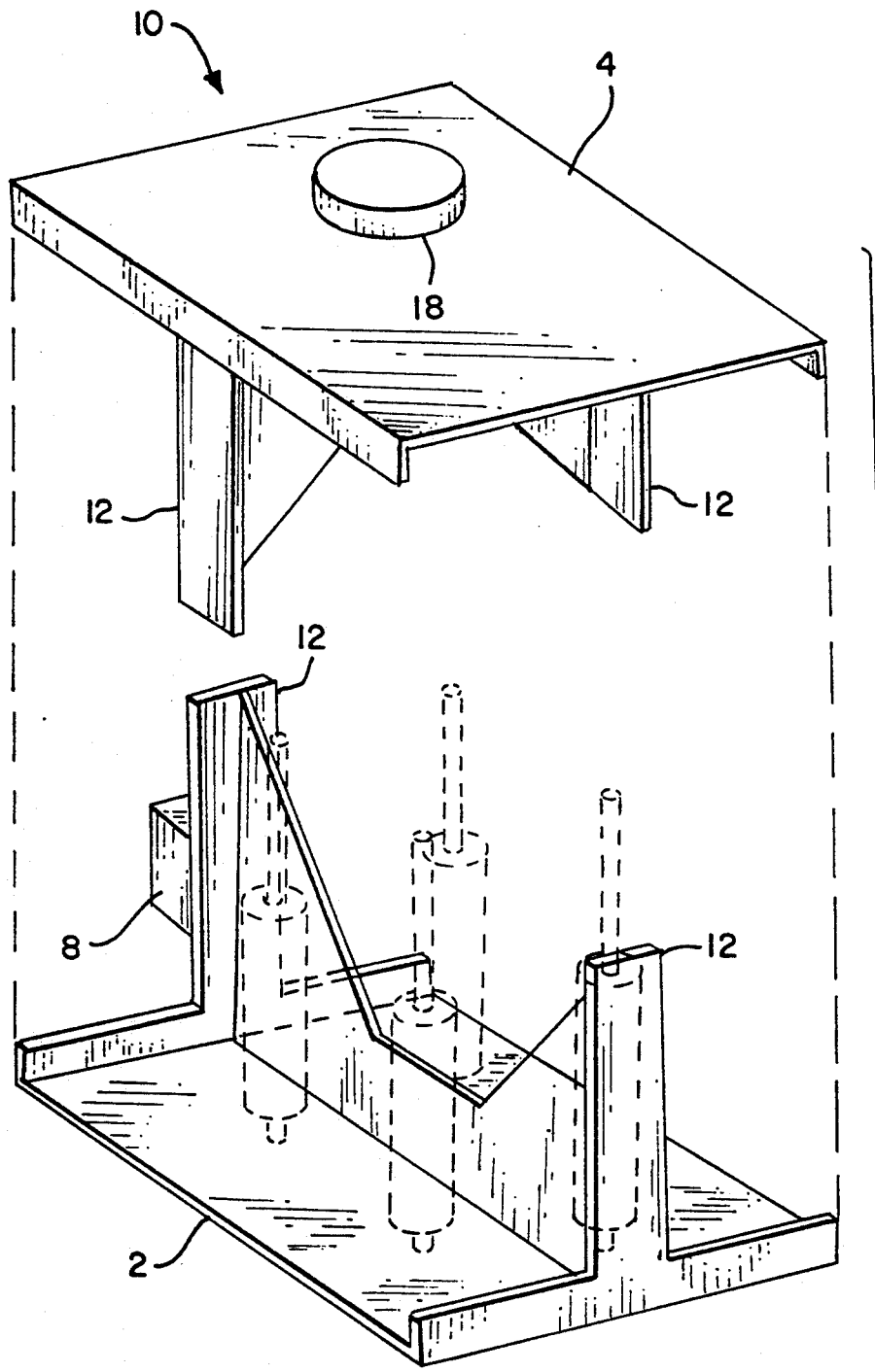
FIG. 3 is a perspective view of the first and second "U" frames of the segment of FIG. 2.
Figure 17:
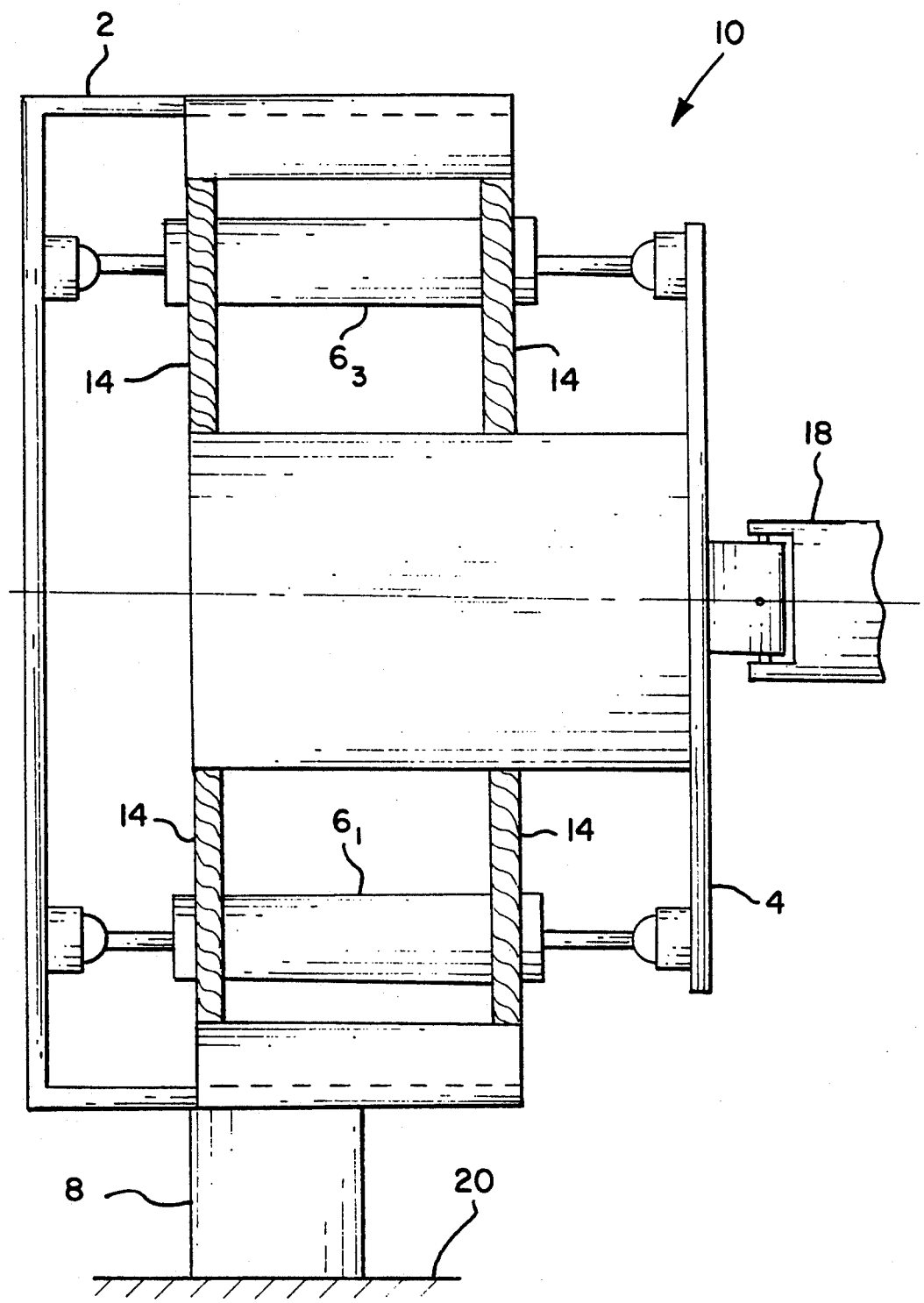
FIG. 17 depicts the segment of FIG. 2 having a gimbled inter-segment attachment bracket.

FIG. 3 shows a somewhat greater detail of the first "U" frame 2 and the second "U" frame 4 with the cable segments 14 removed for clarity; the actuators 61, 62, 63, and 64 are shown in phantom for orientation purposes. In this view, stiffeners 12 can be clearly seen on the two "U" frames 2 and 4. Also shown in this view is an inter-segment attachment means or bracket 18, which is essentially a cylinder, and used to interconnect a plurality of segments 10; i.e., the first "U" frame of one segment 10 is connected to the second "U" frame of an adjacent segment 10. As shown in FIG. 17, in some circumstances, it would be desirable to have bracket 18 pivotable or gimbled so as to allow another degree of freedom to the climbing robot.

Figure 4:
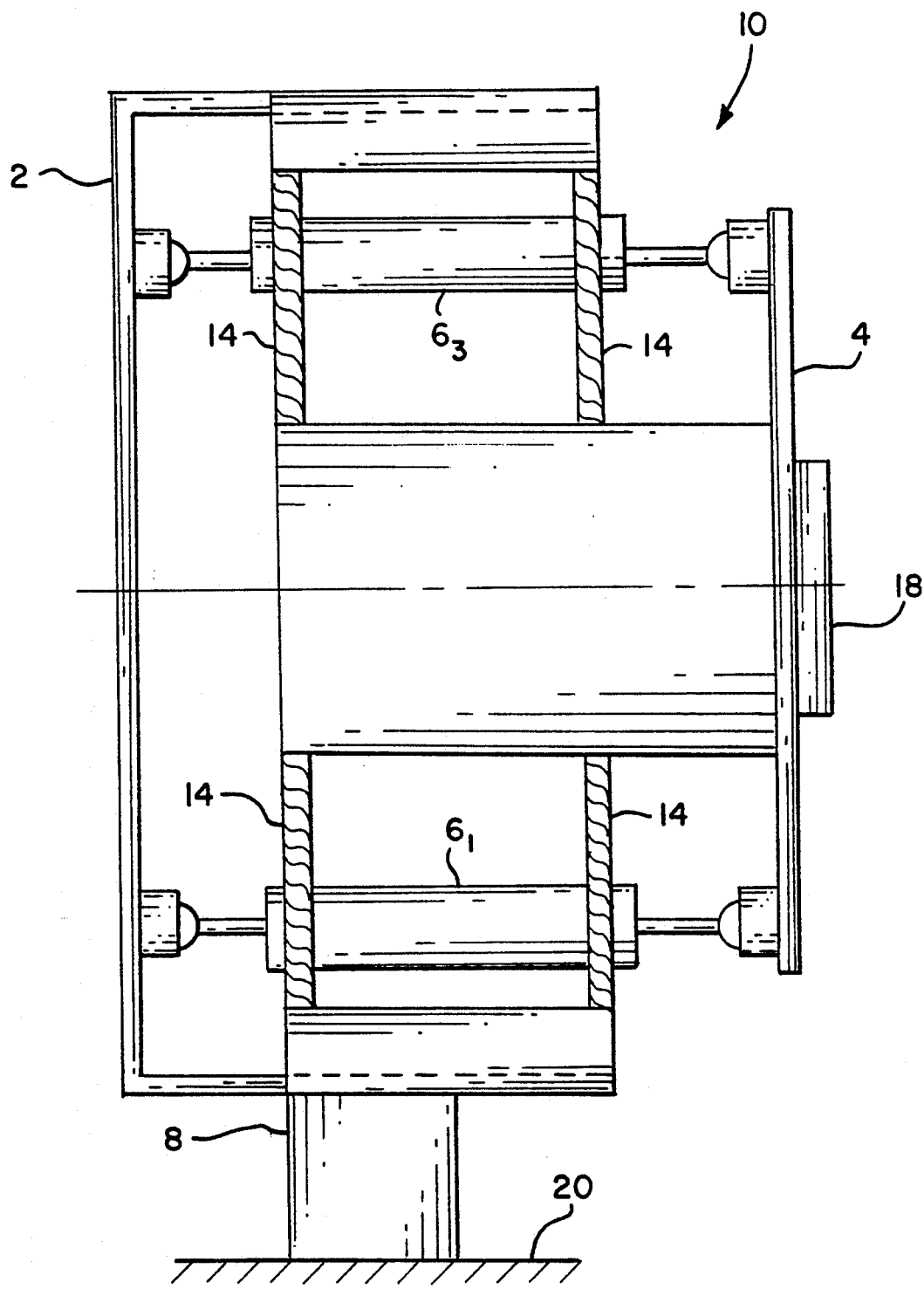
FIG. 4 depicts the segment of FIG. 2 with its actuators in a neutral position.
Figure 5:
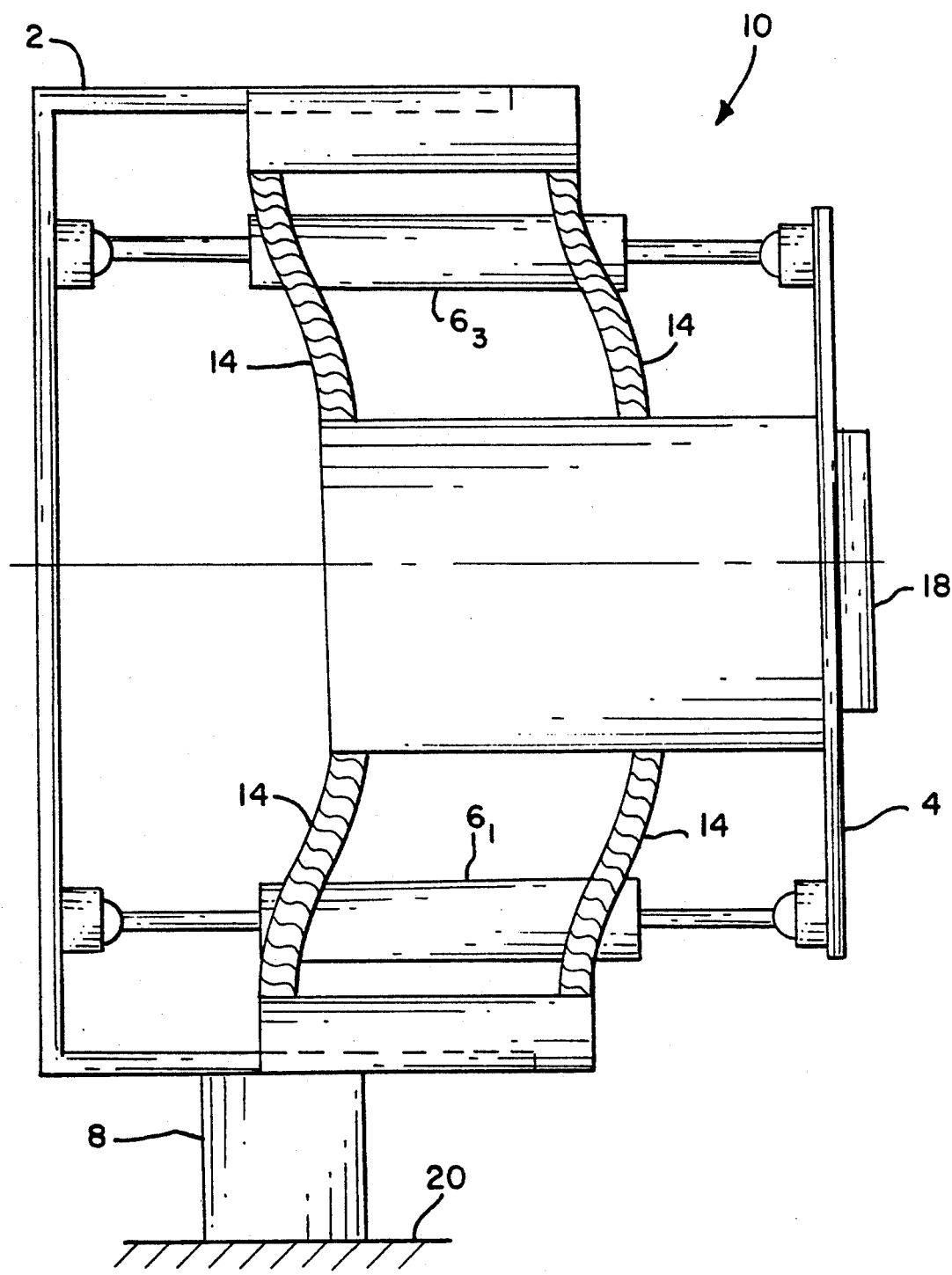
FIG. 5 depicts the segment of FIG. 2 with its actuators expanded.
Figure 6:
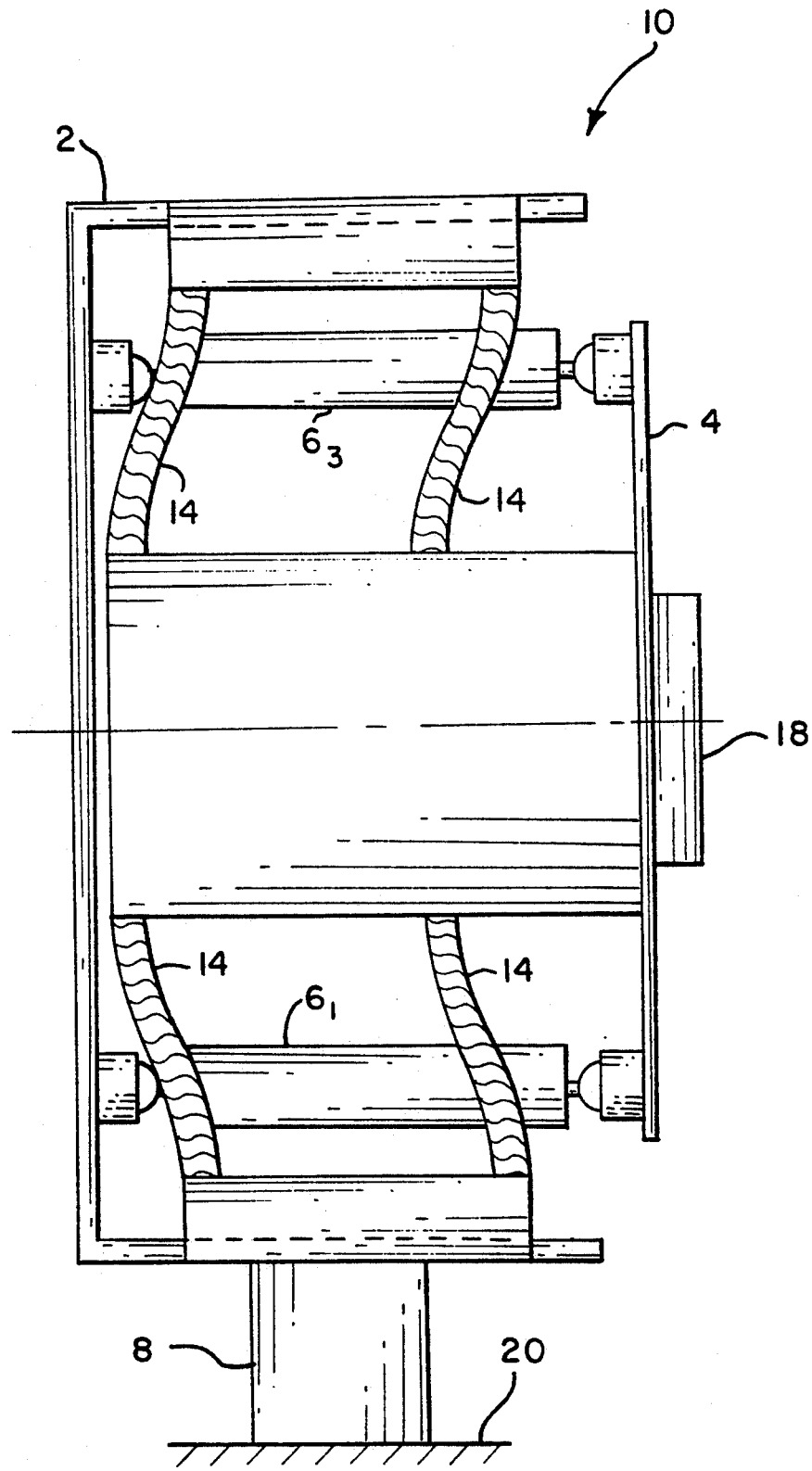
FIG. 6 depicts the segment of FIG. 2 with its actuators contracted.
Figure 7:
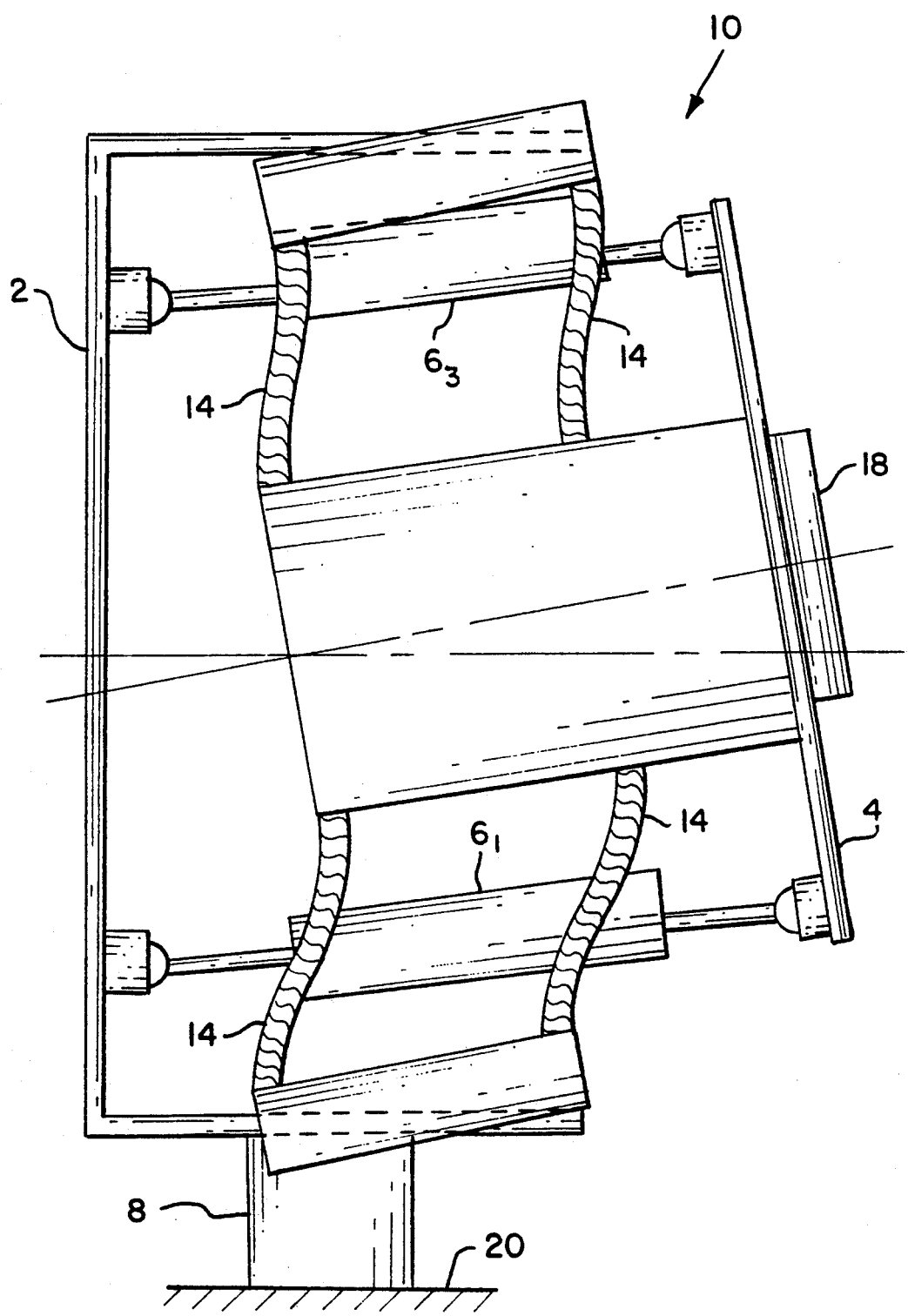
FIG. 7 depicts the configuration of the segment of FIG. 2 when the robot is twisting upwards.
Figure 8:
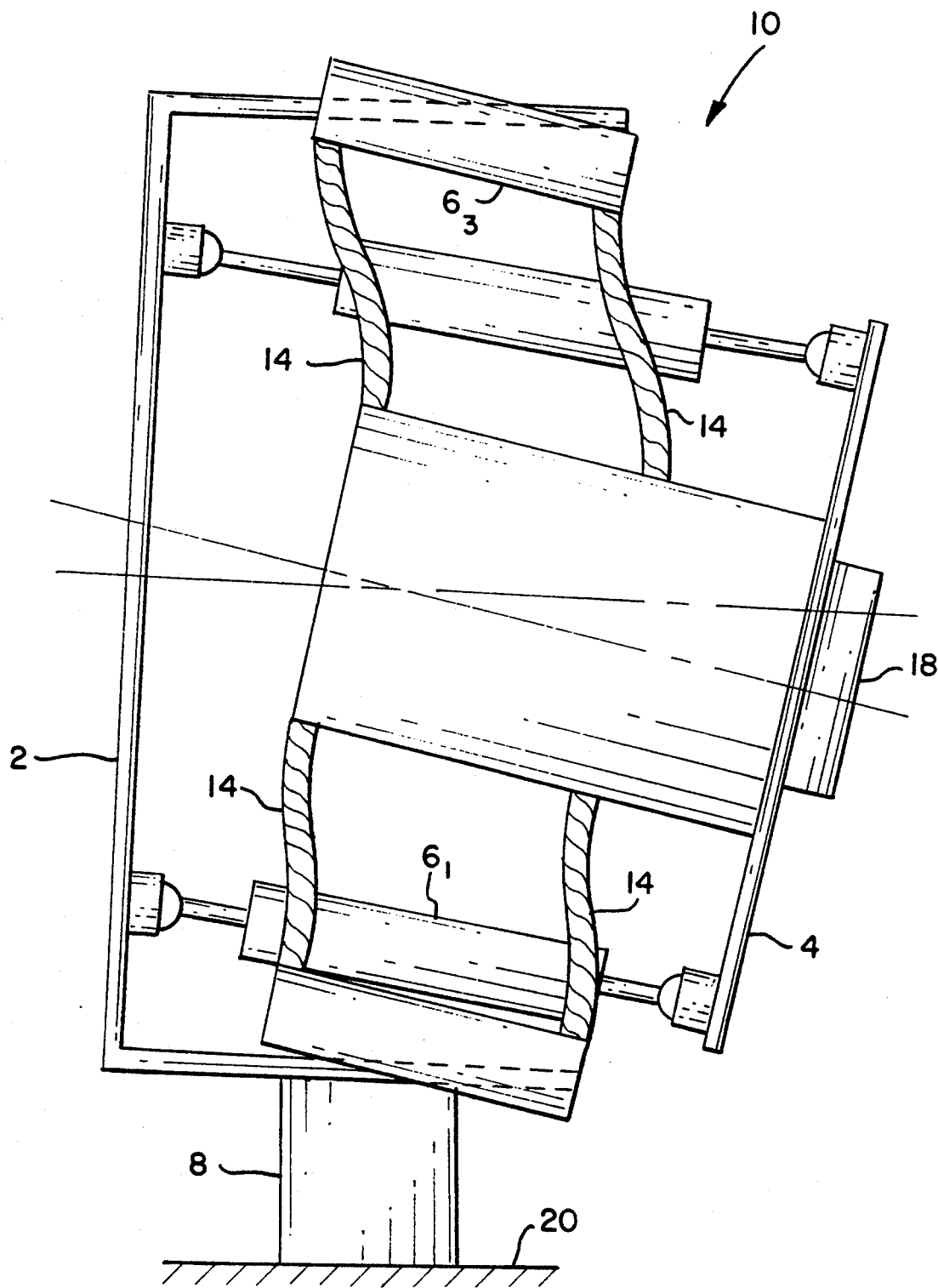
FIG. 8 depicts the configuration of the segment of FIG. 2 when the robot is twisting downwards.
Figure 9:
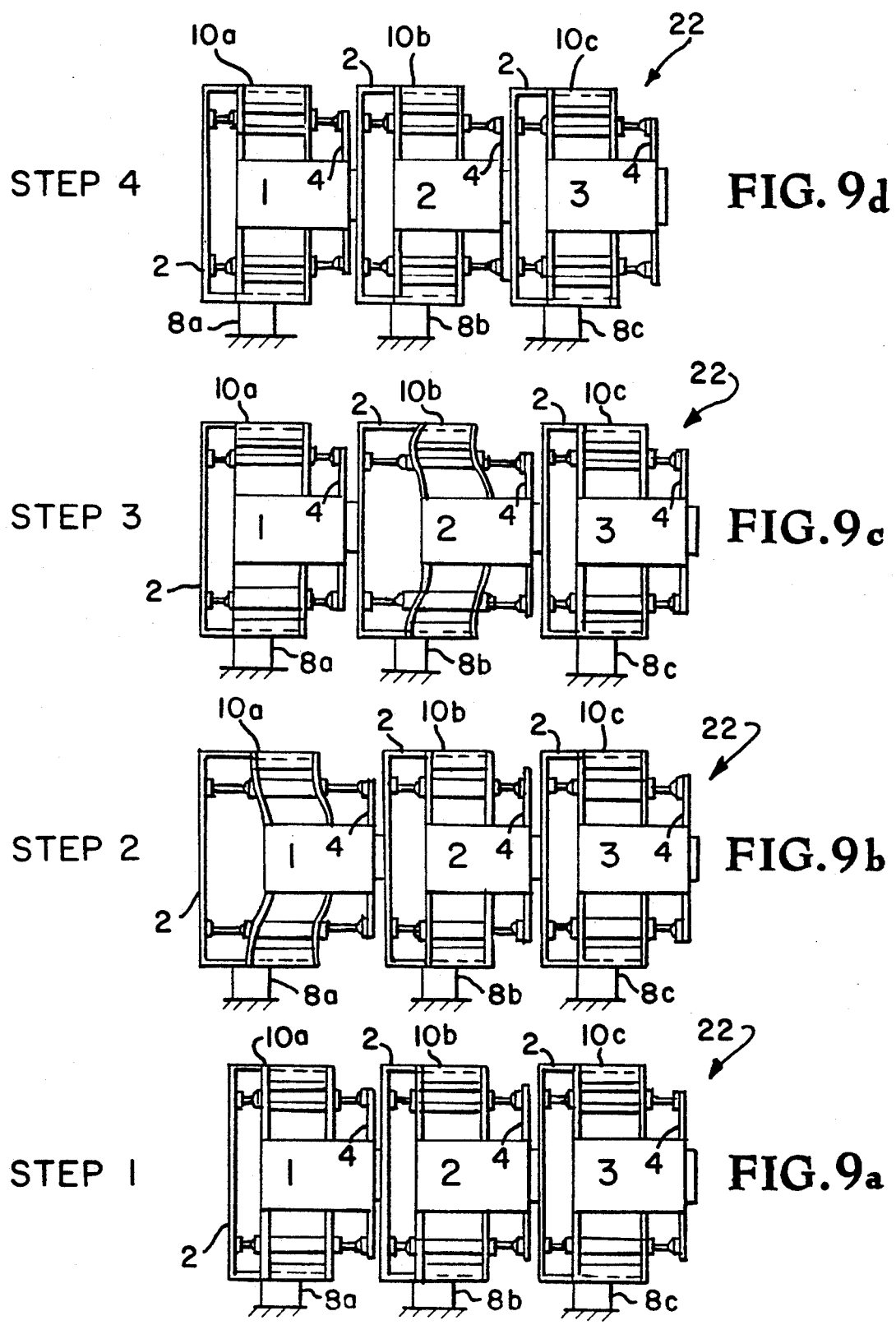
FIGS. 9a-9d show the steps involved in forward motion of the robot.

FIG. 4 shows the configuration of segment 10 when the actuators 61, 62, 63, and 64 are in a neutral position. FIG. 5 shows the configuration of segment 10 when the actuators 61, 62, 63, and 64 are in an extended position. FIG. 6 shows the configuration of segment 10 when the actuators 61, 62, 63, and 64 are in a contracted position. FIG. 7 shows the configuration of segment 10 when the actuators 63, and 64 are contracted and the actuators 61, and 62 are extended as when the climbing robot is twisting upwards. FIG. 8 shows the configuration of segment 10 when the actuators 63, and 64 are extended and the actuators 61, and 62 are contracted as when the climbing robot is twisting downwards. A similar configuration would exist when the climbing robot is twisting left or right.

FIGS. 9a-9d show the steps involved in forward motion of a three segment climbing robot 22. Segments 10a, 10b, and 10c are linked together by a rigid attachment bracket. In step 1 (FIG. 9a), the actuators in all three segments are in the neutral position shown in FIG. 4 and all three magnets, 8a, 8b, and 8c are on. In step 2 (FIG. 9b), magnet 8a on segment 10a is turned off while magnets 8b and 8c remain on. The actuators in segment 10a are extended as in FIG. 5 while the actuators in segments 10b and 10c remain in the neutral position. After the first "U" frame 2 of segment 10a has moved forward, magnet 8a is turned back on which keeps first "U" frame 2 of segment 10a fixed in its new forward position. In step 3 (FIG. 9c), magnet 8b is turned off, the actuators in segment 10b are extended, and then magnet 8b is turned back on. Step 4 (FIG. 9d) completes the forward movement of robot 22 by moving segment 10c forward as described for segments 10a and 10b. Robot 22 has now moved one "step" forward in a manner similar to that of a caterpillar. This process is repeated as necessary to move robot 22 the desired distance. Backward motion of robot 22 is accomplished by merely reversing steps 1-4.

Figure 10:
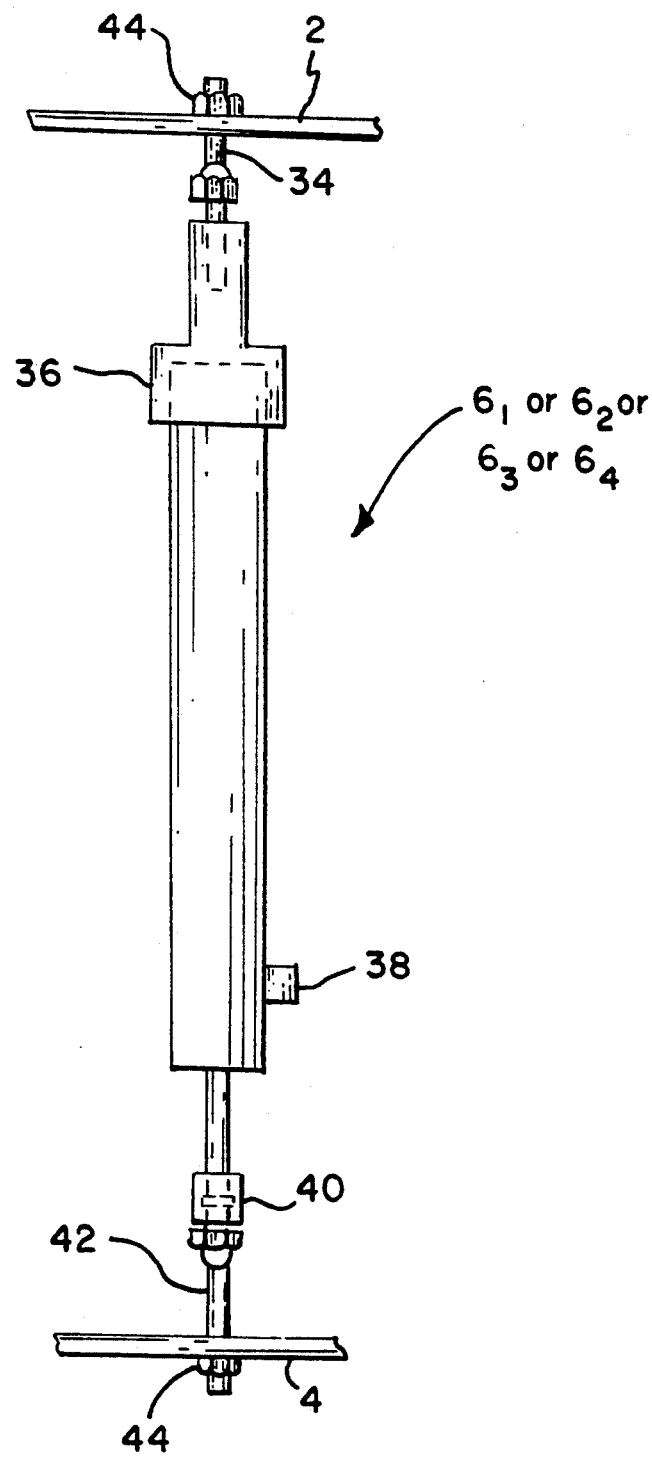
FIG. 10 shows the detail construction of an actuator used in the segment of FIG. 2.

FIG. 10 shows the detailed construction of actuator 61, 62, 63, and 64 used in the segments of the climbing robot. First "U" frame 2 and second "U" frame 4 are drilled and tapped as necessary. A standard commercial ball end pivot 34 is threaded into the tapped hole in first "U" frame 2 with a nut 44 on the other side to prevent it from backing off. An adapter 36 is necessary to join the ball end pivot 34 to actuator 61, 62, 63, and 64. The same is true on the other end of actuator 61, 62, 63, and 64, i.e., an adapter 40 is necessary for ball end pivot 42. A port 38 is connected to an external power source. Actuator 61, 62, 63, and 64 can be pneumatic, hydraulic or electric.

Figure 11A:
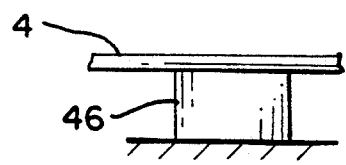
FIGS. 11a-11h show a variety of feet that can be mounted to the segment of FIG. 2.
Figure 11B:
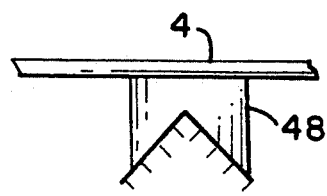
Figure 11C:
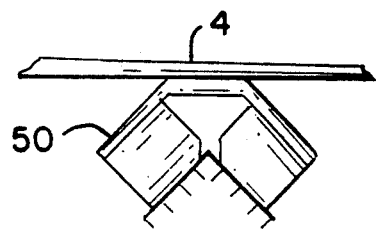
Figure 11D:
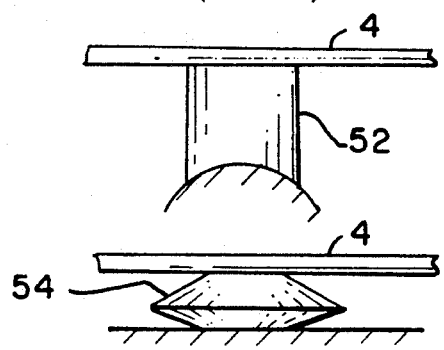
Figure 11E:
Figure 11F:
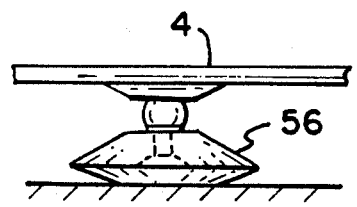
Figure 11G:
Figure 11H:
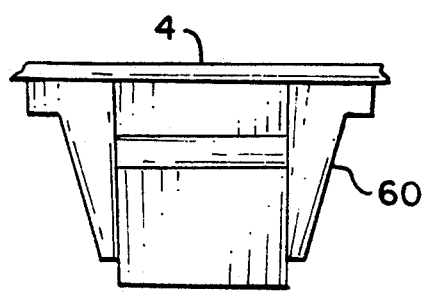

FIGS. 11a-11h show a variety of feet that can be mounted to the segments of a climbing robot. There are four types of electro-magnetic feet shown; magnetic foot 46 for flat surfaces mounted to second "U" frame 4 as shown in FIG. 11a, magnetic foot 48 for angle iron shown in FIG. 11b; magnet foot 50 for angled surfaces shown in FIG. 11c and magnetic foot 52 for curved surfaces shown in FIG. 11d. FIG. 11e shows an air cushioned foot 54 for traversing concrete or wood floors. Simply pump up air cushioned foot 54 for segment motion and deflate air cushioned foot 54 to anchor the segment. FIG. 11f shows a suction cup foot 56. Suction cup foot 56 can also be held with an adductor where necessary. FIG. 11g shows wheels 58 as the feet of a segment. These wheels 58 do not need to be driven by a power source as one set of wheels can be held electrically or pneumatically while another set of wheels is allowed to move via the actuators. FIG. 11h shows a simple gripper as a foot 60.

Figure 12:
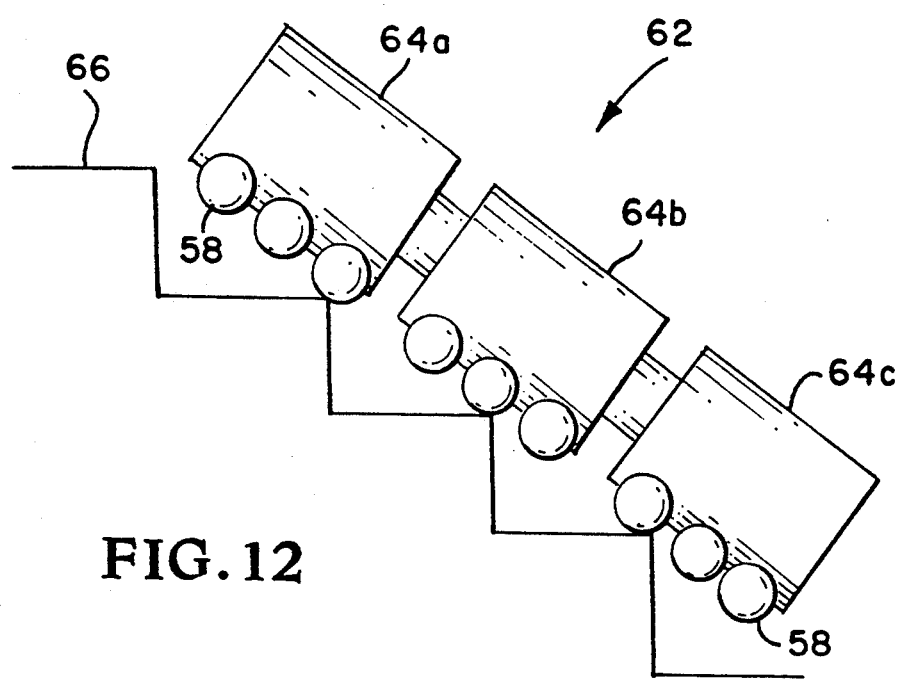
FIG. 12 shows how a climbing robot could negotiate stairs.

FIG. 12 shows how a climbing robot 62 having three segments 64a-64c each having a plurality of wheels 58 could negotiate stairs 66. This type of robot offers some interesting possibilities. The individual segments 64a-64c can have a truck like a railroad car. This truck can be mounted on a cable compliant mechanism. The wheels 58 will then move around and adjust themselves to the surface with the help of double compliance, both to hold the segments together and to hold the wheels together. Also, it is possible to use power in the wheels where necessary. It is also possible to brake the wheels when necessary while the actuators are lifting the segments up the stairs. It is also possible to brake one side of the segment and free the other while the outboard actuator is elongating and the inboard actuator is contracting. This will enable robot 62 to come up to a landing and then turn left and go up a pair of stairs.

Figure 13:
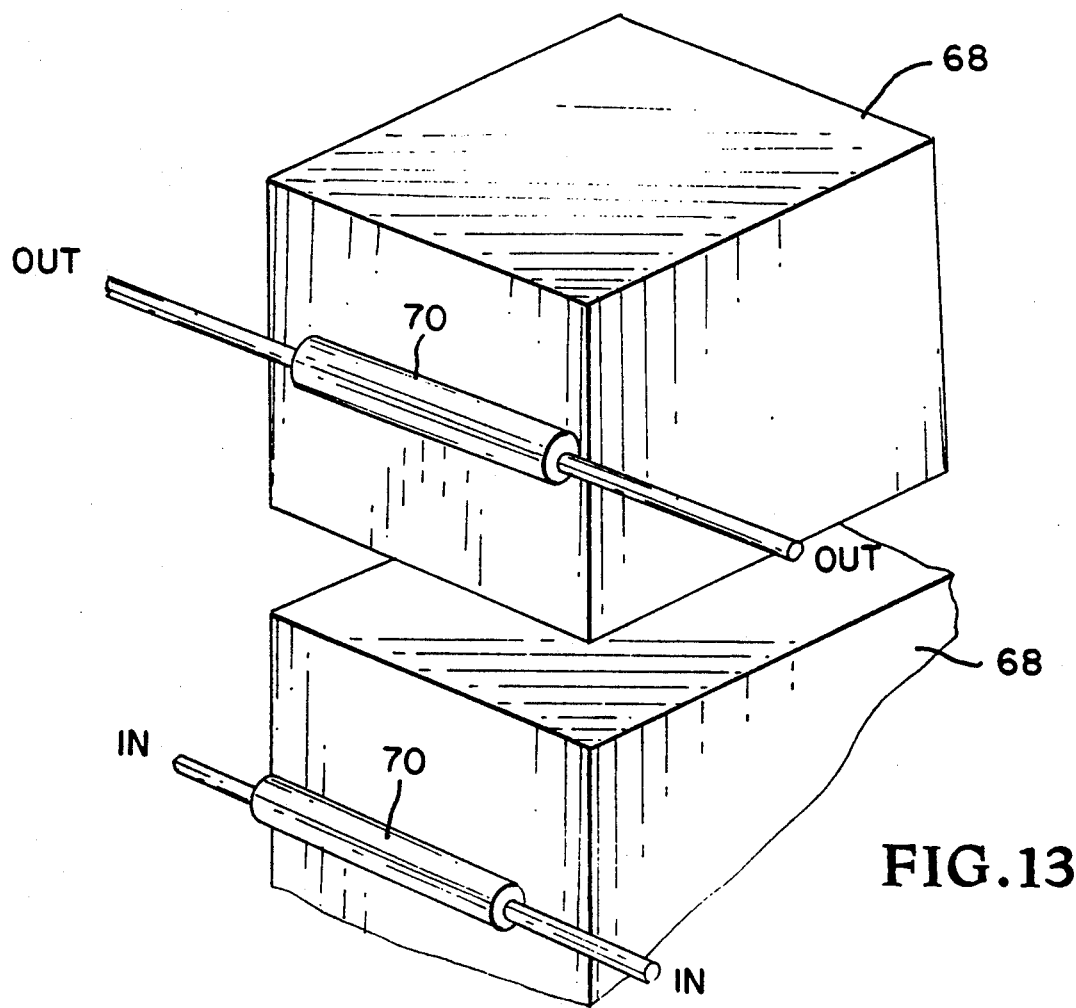
FIG. 13 shows a gripper that can be added to the segment of FIG. 2.

FIG. 13 shows a gripper 70 that can be added in place of or in addition to the foot of a segment 68. This type of gripper is especially useful in pipes or heating ducts where additional gripping power may be needed.

Figure 16:
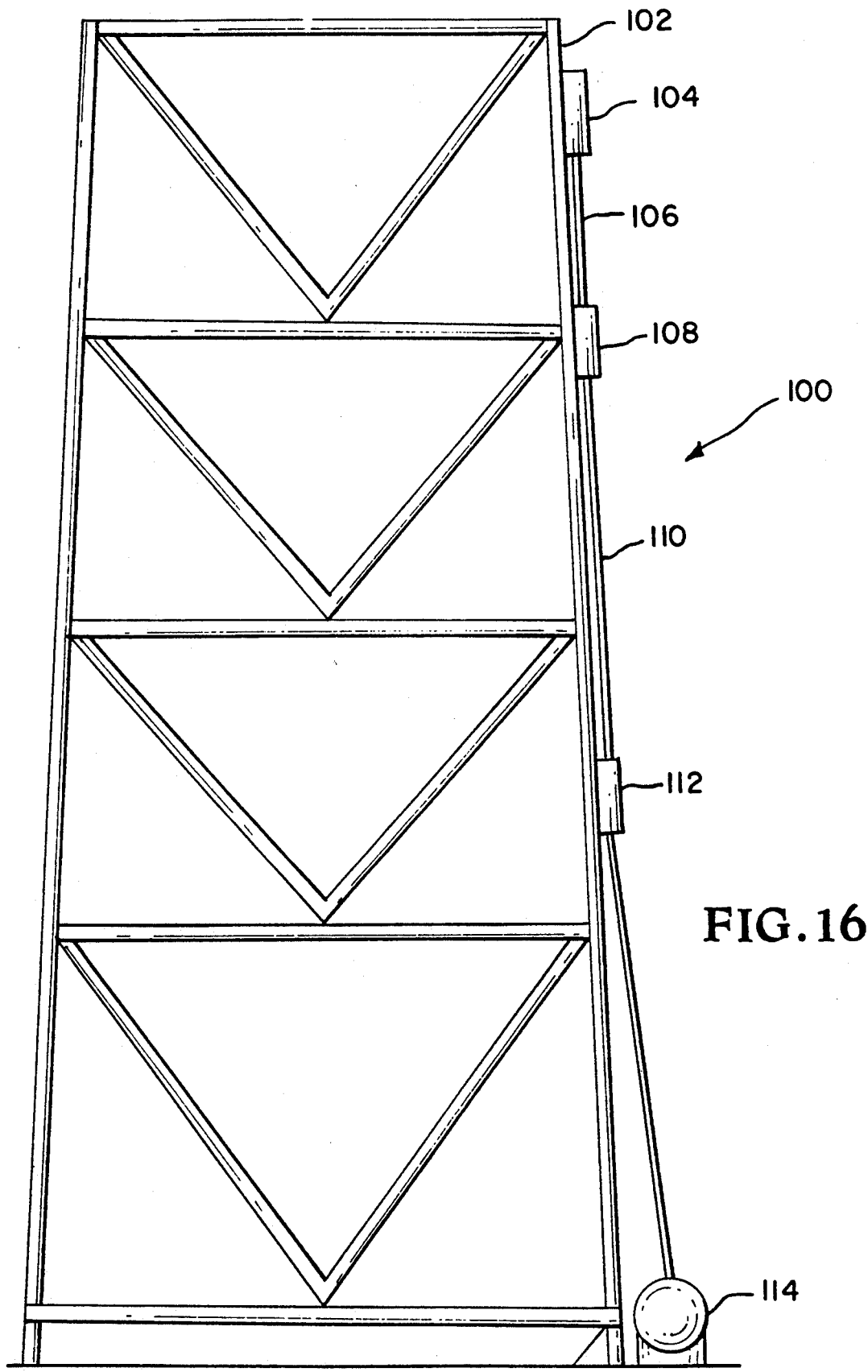
FIG. 16 is a depiction of a multiple robot system for handling high loads.

FIG. 16 is a depiction of a multiple robot system 100 for handling high loads. In this embodiment, lead robot 104 climbs a leg of tower 102, clears the surface and makes a path for the other robots. It has a safety line 106 to working robot 108 to prevent a loss of working robot 108. Working robot 108 can clean, spray paint, rub paint weld, etc. Connected to working robot 108 is a slave robot 112, which caries lead line 110 to working robot 108. Lead line can be an air line, electric, hydraulic, etc., and is connected to device 114 on the ground, which is an air compressor, generator, hydraulic pump, etc. This embodiment is useful as it is much easier to keep a few heavy tanks on the ground rather than haul them up tower 102. It should be noted that there can be as many slave robots as necessary to carry out a work task; e.g., arc welding may require heavy wires but enough slave robots can be made to do this task.

Figure 14:
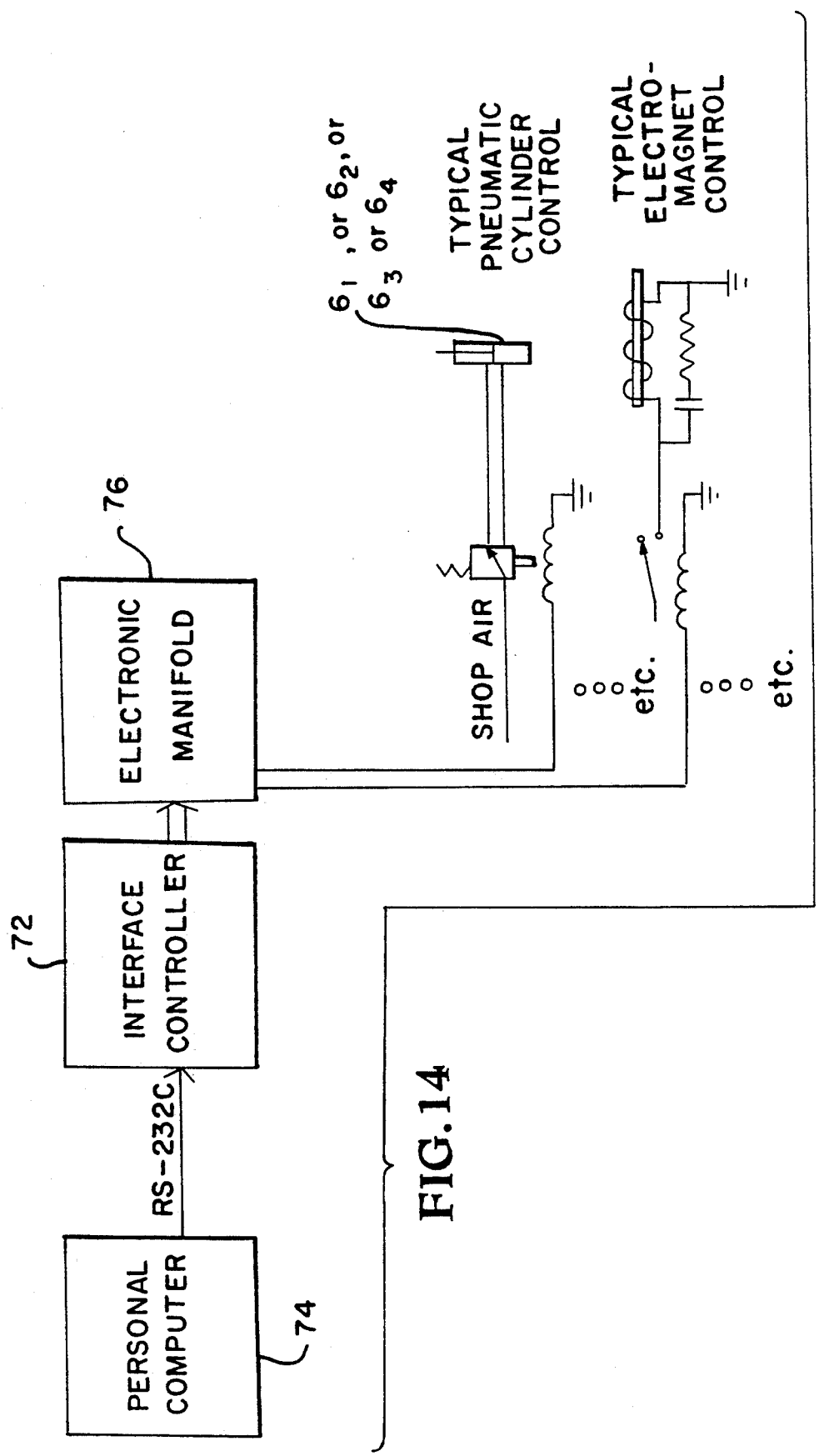
FIG. 14 is a block diagram of a prototype controller initially used for the climbing robot.

FIG. 14 is a block diagram of a prototype controller initially used for the climbing robot. A standard off the shelf programmable controller 72 generally used for the automated machine industry was used with communications to a host computer 74 to operate the basic functions of the climbing robot. Computer 74 acted as a 'dumb' terminal and the programmer sent programs to controller 72 from computer 74 via serial link 80. Controller 72, which allowed up to 16 outputs (on/off) and 8 inputs, ran a program which sent signals via manifold 76 to valve 78 in set periods of time. Valves 78 are spring returned solenoid actuated 4-way type which send 80 psi shop air to one side of the piston in actuator 6 and exhausts the other. The off (solenoid de-actuated) position is to retract the cylinder in actuator 6. Each actuator 6 has a valve and the associated tubing.

Figure 15:
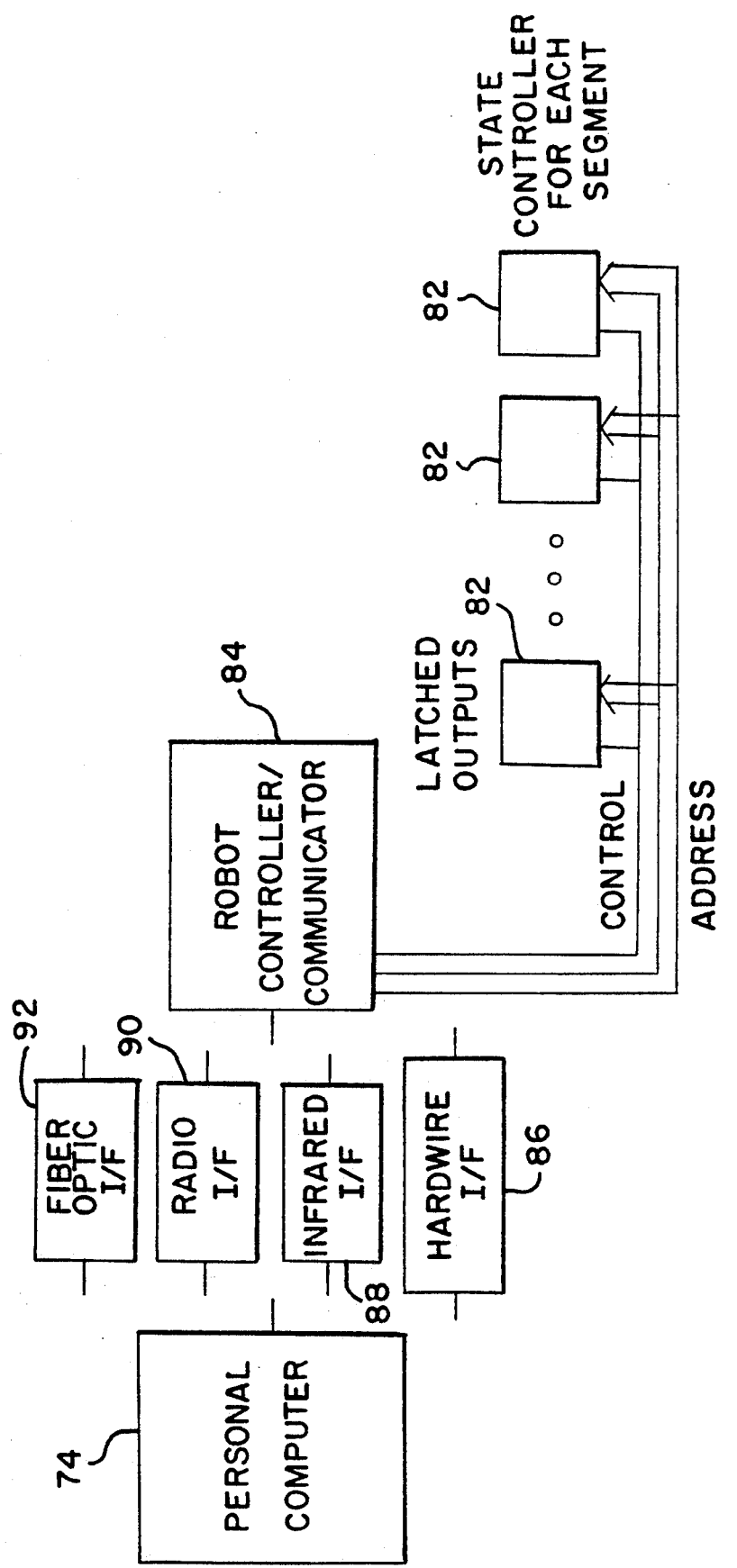
FIG. 15 is a block diagram of an advanced controller used for the climbing robot.

FIG. 15 is a block diagram of an advanced controller used for the climbing robot. In this scheme, a Programmable Logic Device (PLD) 82 or distributed 'state' controller is operate each robot segment. A PLD is pre-programmed to control each segment type. The controller/communicator 84 then simply sends a state to each segment when a change in the state is required. This can be accomplished with a parallel or serial communications protocol and the controller/communicator 84 may be some distance from the robot itself. The communications from computer 74 to controller/communicator 84 located on the robot can be via wires 86, infrared communications 88 (if line of sight is possible), fiber optics 92 or radio 90.

Connected to the computer outputs are circuits which convert the digital logic signals to coil drivers which actuate the miniature air valves for the actuators. The same coil drivers will drive relays to turn on or off the electromagnets. The digital side is protected by opto-isolators, and the relays are protected by snubber circuits.

Advanced control schemes are possible where the states may include steppers or servo modes such as camera pan and tilt, however, with just eight control lines, one can divide 360 degrees of pan into 256 parts, or every 1.4 degrees. Keeping in mind the basic tenant of 'distributed state controllers' ensures ease of programming and low cost segment assemblies.

A programming environment can be made available in which the programmer will assemble a robot from a menu, and with object oriented programming techniques, the programs would be put together with great speed. The segments would know what states were available depending upon which segments it were attached to, etc.

The user interface would be a simple hand held interface with a liquid crystal display or other inexpensive text interface that the user could choose options from a menu to control the motions of the robot.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A mobile robot for traversing a surface comprising:
a plurality of interconnected segments, each said interconnected segment comprising:
a first frame member;
second frame member;
a compliant joint between said first frame member and said second frame member;
a plurality of linear actuators affixed between said first frame member and said second frame member, said actuators acting to provide relative displacement between said first and second frame members;
means affixed to said second frame member for adherence of said segment to said surface;
inter-segment attachment means affixed to said first frame member for interconnecting said plurality of segments;
a power source connected to said linear actuators;
means for independently controlling each said linear actuator in each said interconnected segment such that said mobile robot moves in a caterpillar like fashion;
said inter-segment attachment means comprises a rigid cylindrical bracket.

2. The robot of claim 1 wherein said compliant joint between said first frame member and said second frame member comprises one or more cable segments affixed between said second frame member and said first frame member.

3. The robot of claim 2 wherein said cable segments are affixed between said second frame member and said first frame member by a plurality of stiffeners, said cable segments secured to said stiffeners with said first frame member having at least one stiffener affixed at either end and said second frame member having at least one stiffener affixed at either end, and at least four end retainers bent 90° and circumferentially interposed between the adjacent ends of said frame members thereby forming four corners on said cable segments.

4. The robot of claim 3 wherein said plurality of linear actuators affixed between said first frame member and said second frame member comprises four linear actuators.

5. The robot of claim 4 wherein said power source for said linear actuators comprises pneumatic power.

6. The robot of claim 4 wherein said power source for said linear actuators comprises hydraulic power.

7. The robot of claim 4 wherein said power source for said linear actuators comprises electric power.

8. The robot of claim 3 wherein said means affixed to said second frame member for adherence of said segment to said surface comprises an electromagnetic foot.

9. The robot of claim 8 wherein said electromagnetic foot is contoured to fit a particular surface.

10. The robot of claim 3 wherein said means affixed to said second frame member for adherence of said segment to said surface comprises an air cushioned foot.

11. The robot of claim 3 wherein said means affixed to said second frame member for adherence of said segment to said surface comprises a suction cup foot.

12. The robot of claim 3 wherein said means affixed to said second frame member for adherence of said segment to said surface comprises a plurality of wheels.

13. The robot of claim 3 wherein said means affixed to said second frame member for adherence of said segment to said surface comprises a gripper as a foot.

14. The robot of claim 3 wherein said first and said second frame members are "U" shaped.

15. The robot of claim 3 wherein said means for independently controlling each said linear actuator in each said interconnected segment such that said mobile robot moves in a caterpillar like fashion comprises:
a computer means; and
means connected to said computer for selectively controlling said power source connected to said linear actuators.

16. The robot of claim 15 further comprising a state controller for each said segment.

17. A mobile robot for traversing a surface comprising:
a plurality of interconnected segments, each said interconnected segment comprising:
a first frame member;
second frame member;
a compliant joint between said first frame member and said second frame member;
a plurality of linear actuators affixed between said first frame member and said second frame member, said actuators acting to provide relative displacement between said first and second frame members;
means affixed to said second frame member for adherence of said segment to said surface;
inter-segment attachment means affixed to said first frame member for interconnecting said plurality of segments;
a power source connected to said linear actuators;
means for independently controlling each said linear actuator in each said interconnected segment such that said mobile robot moves in a caterpillar like fashion;
said inter-segment attachment means comprises a gimbled bracket.

* * * * *